3,198,680
METHOD OF RETREADING TIRES USING SPRAY CEMENT CONTAINING HIGH CONCENTRATION OF ACTIVATOR
Alfred N. Iknayan, Indianapolis, Ind., assignor to United States Rubber Company, New York, N.Y., a corporation of New Jersey
No Drawing. Filed Feb. 19, 1962, Ser. No. 174,270
10 Claims. (Cl. 156—96)

This invention relates to a method of retreading tires, and more particularly it relates to an improved method of adhering a new vulcanizable tread to a used cured tire carcass, with the aid of a spray cement composition containing an unusually high concentration of a migratory accelerator-activator.

The problem to which the invention is directed to solving arises in retreading tires in accordance with conventional practice by applying a new tread composed of rubber stock compounded for vulcanization to the buffed surface of a used, cured tire carcass. A cement containing rubber, vulcanizing ingredients and solvent is usually applied to the buffed surface of the carcass prior to application of the new tread. The assembly is then subjected to heat in a retreading mold to vulcanize the tread and at the same time cause it to adhere to the cement-coated carcass. Unfortunately the new tread does not always adhere to the carcass as well as would be desired because it is in general quite difficult to obtain good adhesion to previously cured rubber.

In accordance with the present invention, it has now been found, unexpectedly, that excellent adhesion of a new tread to a cured carcass can be achieved by employing a vulcanizable rubber cement which contains a large excess of a rubber-solvent soluble migratory accelerator-activator of sulfur vulcanization selected from the group consisting of those of the aldehyde-amine class, dibutylammonium oleate and morpholine (2,3,5,6-tetrahydro-1,4-oxazine). The aldehyde-amine class of accelerator-activator of the sulfur vulcanization of unsaturated rubbers is a conventional class of accelerator-activators made in known manner by reacting one or more aldehydes, such as acid aldehyde, butyraldehyde, alphaethyl betapropyl acrolein, or the like, with an amine, such as aniline, butylamine, etc. While it is not desired to limit the invention to any particular theory of operation, it is believed to be possible that the remarkable success of such a cement in providing good adhesion between a new tread and a cured carcass is related in large part to the peculiar fact that an excess of the migratory accelerator-activator is apparently capable of forestalling degradation of the rubber at the tread-carcass interface by entrapped air at elevated temperatures. I have made the observation that regardless of the quality of the buffed surface of the carcass and the care with which the new tread is applied to such surface in any commercial recapping operation a large quantity of air is incorporated or trapped at the interface between the new tread and the buffed surface. As pressure is applied to the interface in the building and molding operation, this accumulation of air is generally concentrated into localized areas. I believe that these localized areas are sites of hot air or oxygen degradation of the conventional rubber curatives used in the conventional cement and adjacent stock. Unexpectedly, I have found that the incorporation, in the cement, of a large excess of a migratory accelerator-activator of the class defined apparently somehow neutralizes this air degradation and surprisingly results in the elimination of localized areas of poor adhesion.

The tire carcass which may be recapped in accordance with the invention may be made of any conventional vulcanized rubber composition whether natural rubber or a synthetic rubber such as cis-polybutadiene or cis-polyisoprene or a rubbery copolymer of a diene with a copolymerizable monomer such as styrene, acrylonitrile, vinylpyridine, or the like, or a mixture of such rubbers with or without other materials such as reclaimed rubber. These rubbers or elastomers may be referred to as unsaturated rubbers or diene rubbers, in which category I include natural rubber and the homopolymers and copolymers containing a diene, as well as butyl rubber (a copolymer in which the diene is usually isoprene and the copolymerizable monomer is usually isobutylene), and unsaturated rubbers such as those made by copolymerizing ethylene and propylene or the like with conjugated or non-conjugated dienes, including open chain dienes such as hexadiene and cyclic dienes such as dicyclopentadiene. Butadiene-styrene rubber and natural rubber, and mixtures thereof, are especially preferred. The carcass may of course be vulcanized in any suitable conventional manner, using such vulcanizing agents as sulfur along with the usual accelerators, antioxidants, fillers such as carbon black, and any other desired compounding ingredients in conventional amounts.

The new tread may similarly be based on any such diene rubber, of course in the unvulcanized state but compounded so as to be vulcanizable under the usual retreading conditions (275°–330° F. for 40 minutes to 8 hours) by reason of the presence, in conventional amounts, of sulfur or equivalent vulcanizing agent, accelerator, as well as carbon black and any other suitable desired compound ing ingredients.

The cement employed to adhere the new vulcanizable rubber tread to the cured carcass in accordance with the invention comprises 100 parts (by weight) of a diene rubber as previously defined, from 0.5 to 5 parts of sulfur or equivalent vulcanizing agent, and from 0.5 to 5 parts of any suitable accelerator of sulfur vulcanization such as a guanidine accelerator and/or a carbon disulfide type accelerator (e.g., diphenyl guanidine, benzothiazyl disulfide, zinc dimethyldithiocarbamate, tetramethylthiuram disulfide, or any other suitable guanidine and/or carbon disulfide accelerator as disclosed for example in "Chemistry and Technology of Rubber" by Davis and Blake, pages 302–303), together with sufficient conventional volatile rubber solvent (e.g., hydrocarbons, chlorinated hydrocarbons, ethers, ketones, etc., such as carbon tetrachloride, heptane, toluene, carbon disulfide, ether, chloroform, benzene, or any of the solvents mentioned in the Davis and Blake book, pages 201–202) to render the cement of spraying consistency, usually from about 1500 to 4000 parts by weight of solvent. The cement may further include the usual pigments or fillers such as carbon black, retarders, antioxidants and other desired conventional compounding ingredients. As thus far described the cement follows essentially conventional practice. However, the invention further contemplates the inclusion in the cement of an excess quantity of a migratory rubber-solvent soluble accelerator-activator selected from the group consisting of aldehydeamine condensation product, dibutylammonium oleate and morpholine (2,3,5,6-tetrahydro-1,4-oxazine). Among the commercially available accelerator-activators of this kind may be mentioned "Beutene" (condensation product of one mole aniline, two moles butyraldehyde), "A-32" (butyraldehyde and butylidene aniline reaction product), "Accelerator 808" (butyraldehyde-aniline), "Accelerator 833" (butyraldehydebutylamine), "Hepteen Base" (heptaldehyde-aniline), "Phenex" (aniline-alphaethyl betapropyl acrolein), and "Barak" (dibutylammonium oleate). These materials, as well as morpholine, are liquids. Such ingredient is referred to as migratory because it is capable of migrating or diffusing from one rubber layer to another especially under vulcanizing conditions. These chemicals accelerate and activate sulfur vulcanization of rubber. The invention involves employing in the cement a far larger quantity of such migratory accelerator-activator of sulfur vulcanization than would ordinarily be used for the amount of rubber in the cement. Thus, the present practice involves adding from 5 to 160 parts, preferably 10 to 80 parts, and most preferably 20 to 40 parts, by weight of the defined accelerator-activator per 100 parts of rubber in the cement. This contrasts markedly to the comparatively small quantity of about 0.5 to 1 part that would conventionally be regarded as sufficient for the amount of rubber in the cement. The cement, formulated as described, is suitably sprayed onto the buffed tire carcass that it is desired to retread and/or onto the undersurface of the new tread stock and after the cement is essentially dry the tread is applied to the carcass, pressed down firmly, and the assembly is enclosed in the retreading mold and subjected to the conventional vulcanizing conditions to adhere the vulcanizable tread to the cured carcass.

The tread adheres with remarkable tenacity to the cured carcass and there is an unprecedented freedom from weak spots or poorly adhered areas. The adhesive bond is especially remarkable for the manner in which it maintains its strength even at elevated temperatures. In many conventional retreaded tires adhesion may not be noticeably lacking at ordinary temperatures, but when high temperatures are developed at the interface as a result of high speed operation weaknesses typically appear at the interface and separation of the tread soon occurs. In contrast, tires retreaded in accordance with this invention maintain good tread adhesion even at elevated temperatures.

The excellent physical properties of the adhesive bond produced in the present method is especially surprising in view of the fact that ordinarily the amount of rubber used in the present cement, if compounded with the large quantity of accelerator-activator here employed, would upon subjecting to vulcanizing conditions become so badly softened and/or peptized that it could not even be handled on conventional mixing equipment. It was therefore indeed unexpected to find that a cement compounded in this manner and used as described would form an adhesive film having excellent physical properties.

Another unusual feature of the present process will be appreciated by considering what happens if it is attempted to use only a small excess of accelerator-activator in the cement. The accelerator-activator in conventional amounts and in amounts slightly in excess of conventional tends to render the cement so readily vulcanizable that the cement gels or prevulcanizes even on standing at room temperature, as evidenced by marked increase in viscosity and early solidification. Thus, a cement containing 2 parts of butyraldehydeaniline, having an initial viscosity of 40 seconds at 84° F., will set up spontaneously to a solid state in three days exposure to a temperature of 160° F. On this basis it might be expected that a cement containing the very large quantities of accelerator-activator employed in this invention would be extremely unstable but the exact reverse is found to be the case that is, the excess accelerator-activator most surprisingly maintains the cement in a condition of low viscosity indefinitely so that it is storable and usable over a long period of time.

It should be noted that the advantages made possible by the present invention could not be enjoyed by adding excess accelerator-activator to the new tread stock or to a tie gum stock or cushion gum stock to be interposed between the tread and carcass, because the excess accelerator-activator causes peptizing of the solid stock and makes normal processing difficult or impossible. It is only by the use of the excess accelerator-activator in a relatively dilute cement of spraying consistency that the advantages of the invention can be enjoyed in practice.

The following example, in which all parts are expressed by weight, will serve to illustrate the practice of the invention in more detail.

*Example*

A used, worn tire made of cured SBR is buffed to remove the remains of the old tread and to present a clean surface of definite contour to receive a new tread. A strip of unvulcanized new tread stock of the following composition is provided:

| Ingredients: | Parts by weight |
|---|---|
| Styrene-butadiene copolymer rubber (SBR) (22.5–24.5% bound styrene) | 100.00 |
| High abrasion furnace carbon black | 6 |
| Highly aromatic oil plasticizer | 30.00 |
| Zinc oxide | 5.00 |
| Stearic acid | 3.00 |
| Diphenyl guanidine accelerator | 0.50 |
| n-Cyclohexyl-2-benzothiazole sulfenimide | 1.00 |
| Sulfur | 2.00 |

A retreading cement is prepared in accordance with the following formulation:

| Ingredients: | Parts by weight |
|---|---|
| Natural rubber | 100.00 |
| Carbon black | 50.00 |
| Zinc oxide | 5.00 |
| Salicylic acid | 1.50 |
| Diphenylamineacetone antioxidant | 2.00 |
| Benzothiazyl disulfide | 1.00 |
| Diphenyl guanidine | 0.50 |
| Sulfur | 2.00 |
| Rubber solvent (133°–263° F. range petroleum distillate) | 2600.00 |
| Butyraldehydeaniline accelerator-activator (or dibutylammonium oleate or morpholine) | 20.00 |

The cement is sprayed onto the buffed surface of the cured carcass, and allowed to dry until it is tacky to the touch. The new tread is applied, pressed down firmly, and enclosed in the retreading mold where it is heated at 300° F. for 2 hours. The adhesion of the tread is excellent, both at room temperature and elevated temperature.

The following table shows the relationship between the concentration of accelerator-activator in the cement and the adhesion, evaluated both at room temperature and at elevated temperature. These tests were made by laminating a vulcanizable stock representing a tread to a previously cured stock representing a carcass, with the aid of a cement of the kind exemplified above, the concentration of accelerator-activator (butyraldehydeaniline) being varied from 0 part to 160 parts as shown in the table.

| Parts of Accelerator-Activator in Cement Per 100 Parts Rubber | Room Temperature Adhesion (72°F) (Hand Pull Rating) | Adhesion at 250° F. (Pounds Pull Necessary to Separate a 1″ Test Strip |
|---|---|---|
| | | *Pounds* |
| 0 | Good | 24 |
| 5 | Very good | 36 |
| 10 | do | 45 |
| 20 | do | ¹55 |
| 40 | do | ¹60 |
| 80 | do | ¹50 |
| 160 | do | ¹42 |

¹ Stock failures rather than interfacial failures.

Although the improvement in adhesion is noticeable even by hand evalution at room temperature, the real extent of the improvement becomes apparent at elevated temperature. The use of more than 10 parts of the accelerator-activator produces especially remarkable results, since the failure at elevated temperatue occurs not at the cement film, but in the stock itself, indicating that the adhesive bond is stronger than the stock itself.

Not only does the use of less than 5 parts of accelerator-activator result in inferior adhesion, but the cement containing such small concentrations of accelerator-activator is actually unstable, that is, it tends to gel or set up prematurely and deos not have a satisfactory shelf life. This is illustrated in the following table:

| Parts of Accelerator-Activator in Cement Per 100 parts Rubber | Original Viscosity Indianapolis Cup 0.218 Plug, Measured at 84° F., seconds | Viscosity After 39 Days' Storage at 160° F., Measured at 80° F. |
| --- | --- | --- |
| 0 | 42 | Set up in 25 days. |
| 2 | 40 | Set up in 3 days. |
| 4 | 41 | Set up in 39 days. |
| 6 | 40 | 65 seconds. |
| 8 | 38 | 66 seconds. |
| 10 | 40 | 48 seconds. |
| 12 | 38 | 39 seconds. |

It is particularly surprising to find that cements containing 5 or more parts of the accelerator-activator have adequate stability, whereas cements containing less than this are not sufficiently stable.

Although 5 parts of accelerator-activator gives a significant improvement in adhesion, optimum bonding is reached in the 20–40 part level. We see from the adhesion data that the interface is still well bonded with as much as 160 parts accelerator-activator, but for reasons of economy and to avoid peptizing the adjacent stock we do not ordinarily use more than 160 parts. The preferred upper limit on the amount of accelerator-activator is 80 parts.

Having thus described my invention, what I claim and desire to protect by Letters Patent is:

1. A method of adhering a new tread comprising a vulcanizable diene rubber composition to a cured tire comprising a diene rubber composition, comprising in combination the steps of providing a retreading cement of spraying consistency comprising, by weight, 100 parts of diene rubber, 0.5 to 5 parts of sulfur, 0.5 to 5 parts of accelerator of sulfur vulcanization, 1500 to 4000 parts of rubber solvent, and 5 to 160 parts of a migratory accelerator-activator selected from the group consisting of aldehydeamine accelerator-activators, dibutylammonium oleate and morpholine, the said cement being stable at room temperature, spraying said cement on a buffer surface of said carcass, applying the said new tread in an unvulcanized condition, and subjecting the assembly to vulcanizing conditions.

2. A method as in claim 1 in which the said accelerator-activator is present in amount of from 10 to 80 parts.

3. A method as in claim 1 in which the said accelerator-activator is present in amount of from 20 to 40 parts.

4. A method as in claim 1 in which the said accelerator-activator is an aldehydeamine.

5. A method as in claim 4 in which the amount of said accelerator-activator is from 10 to 80 parts.

6. A method as in claim 1 in which the said accelerator-activator is butyraldehydeaniline.

7. A method as in claim 6 in which the amount of butyraldehydeaniline is from 20 to 40 parts.

8. A method as in claim 1 in which the said diene rubber is selected from the group consisting of butadiene-styrene rubber and natural rubber.

9. A method as in claim 8 in which the said accelerator-activator is an aldehydeamine present in amount of from 10 to 80 parts.

10. A method as in claim 8 in which the accelerator-activator is butyraldehydeamine present in amount of from 20 to 40 parts.

References Cited by the Examiner

UNITED STATES PATENTS

| 1,893,869 | 1/33 | Morton | 260—796 |
| 2,431,001 | 11/47 | Sullivan | 117—161 X |
| 2,906,740 | 9/59 | Becker et al. | 260—796 |
| 2,948,320 | 8/60 | Ford | 156—334 |
| 2,976,910 | 3/61 | Nowak | 156—96 |
| 3,035,953 | 5/62 | Arnold | 156—334 |
| 3,111,451 | 11/63 | Peters | 156—334 X |

ALEXANDER WYMAN, *Primary Examiner.*

HAROLD ANSHER, *Examiner.*